T. E. BARNUM.
MOTOR CONTROLLER.
APPLICATION FILED SEPT. 9, 1911.
1,113,289.
Patented Oct. 13, 1914.
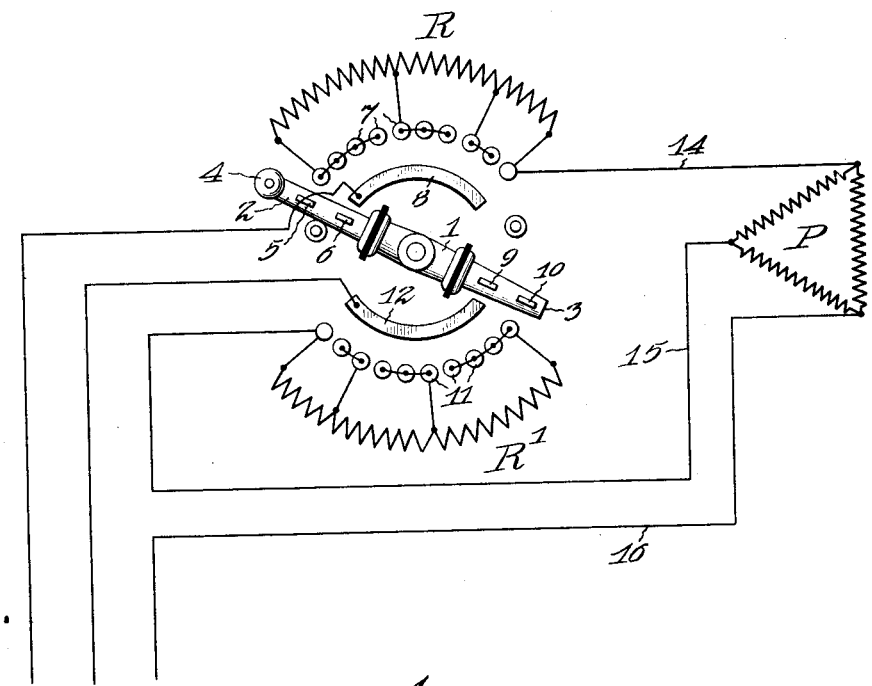
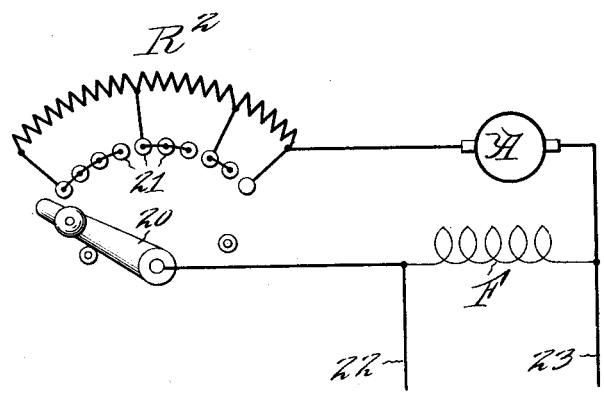
Witnesses:
Inventor:
Thomas E. Barnum.

UNITED STATES PATENT OFFICE.

THOMAS E. BARNUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,113,289.  Specification of Letters Patent.  Patented Oct. 13, 1914.

Application filed September 9, 1911. Serial No. 648,532.

*To all whom it may concern:*

Be it known that I, THOMAS E. BARNUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in the method of and means for controlling electric motors.

In practice I have found, especially with the squirrel cage, A. C. motors that the reduction of voltage desired for starting so reduces the starting torque that the acceleration of the motor is very slow until it has reached approximately half speed. I have also found in practice that due to the peculiar characteristics of such motors the reduction of current taken by the motor is also slow and is only reduced to a small degree upon the motor attaining half speed. Where such conditions are met with the ordinary means used for controlling such motors falls far short of giving ideal starting conditions. According to my invention I propose where such conditions prevail to maintain the impressed voltage at a minimum until the motor reaches approximately one-half of any desired proportion of its normal speed, thereby insuring full protection during this period of slow acceleration. I then propose to remove a certain proportion of the voltage reducing means and to continue the acceleration of the motor without further change until the same has reached approximately three quarters or any other desired proportion of its full speed whereupon I remove another section of the voltage reducing means. Thereafter the remainder of the voltage reducing means may be more quickly removed from circuit either gradually or in one step as desired.

Various means may be employed for carrying out the foregoing method of acceleration. In practice, however, I prefer to employ a device having a controlling element which has a comparatively wide range of movement over a series of contacts and to so connect the voltage reducing means to said contacts as to necessitate movement of the controlling member to such an extent prior to the removal of successive sections of the voltage reducing means to enable the motor to attain the desired proportion of its full speed.

While my invention is particularly applicable to the control of squirrel cage motors it is also applicable to other types of motors including direct current motors and especially shunt wound direct current motors.

In order to more clearly and fully disclose the nature and characteristic features of my invention I shall describe the embodiments thereof, diagrammatically illustrated in the accompanying drawing. It should be understood, however, that my invention is not limited to the specific embodiments thereof illustrated or to these specific applications thereof.

In the accompanying drawing, Figure 1 is a diagrammatic view of a controller for squirrel cage motors, and Fig. 2 is a diagrammatic view of a controller for a shunt wound D. C. motor.

Referring first to the A. C. controller I have shown the same used for controlling resistances R and R' connected in circuit with the primary winding P of a three phase A. C. squirrel cage motor. The controller comprises a pivoted arm 1 formed in three sections the sections 2 and 3 thereof being insulated from the section 1 and accordingly from each other. The arm is provided with a suitable operating handle 4. The section 2 carries contact brushes 5 and 6 electrically connected through said section 2. The brush 5 is adapted to engage and sweep over a series of contact buttons 7 while the brush 6 is adapted to engage and move over a contact segment 8. The section 3 of the arm is also provided with two electrically connected contact brushes 9 and 10, which, like the brushes 5 and 6 are electrically connected. The brush 10 is adapted to engage with and sweep over a series of contact buttons 11 while the brush 9 is adapted to engage and move over a segment 12. The resistance R is connected to the series of buttons 7, opposite terminals of said resistance being connected to the end buttons of said series of buttons. The remaining connections between the resistance R and the series of buttons 7 are such that the brush 5 must be moved to approximately the middle of said series of contacts before removing any of the resistance R and must then be moved slightly over one-half the remaining distance before further removing any of the resistance. The first four contact buttons are electrically connected; the next three buttons are electrically connected and the next two buttons are electrically connected. The resistance R' is connected in a similar manner to the buttons 11 and the buttons 11 are also connected in a similar manner, the connections of the buttons and of the resistance with the buttons being reversed on account of the sections 2 and 3 of the controlling arm being moved in opposite direction. With such an arrangement it will be seen that the arm must be moved approximately one-half of its full movement before removing any of the resistances and approximately three quarters of its full movement before further removing any of the resistances.

The extreme right hand button of the series of buttons 7 is connected by a conductor 14 with one terminal of the primary winding while the extreme left hand button on the series of buttons 11 is connected by conductor 15 with a second terminal of the motor. The third terminal of the motor is connected by conductor 16 directly to one line of the supply circuit 17, 18, 19. The other two lines of the supply circuit are connected to the segments 8 and 12.

With the controller in the position illustrated the circuit of the primary winding is open. To close this circuit the controller arm should be moved in a clockwise direction to cause the section 2 thereof to bridge and electrically connect the segment 8 and the buttons 7 and the section 3 to bridge and electrically connect the segment 12 and contact buttons 11. Continued movement of the controller arm in a clockwise direction will, of course, remove the resistances to accelerate the motor.

Assuming that the range of movement of the controller arm is sufficient to enable the motor to attain full speed before said arm reaches the limit of its movement and that, as is customary in practice, the arm is moved at a slower speed during the initial part of its movement than during the latter part of its movement, it will be seen that the motor will be enabled to attain approximately one-half its full speed before any of the resistance is removed from circuit. It will also be observed that after removal of the first step of resistance no more resistance will be removed from circuit until the motor has attained approximately three quarters of its full speed. Of course, in practice the steps of resistance may be graduated as desired.

Referring now to Fig. 2, I have shown a shunt wound motor having an armature A and a shunt field winding F, controlled by a device including a controller arm 20 movable over a series of contact buttons 21. The contact buttons 21 are connected to a resistance $R^2$ connected in series with the motor armature. The buttons 21 are connected together in a manner similar to that shown in Fig. 1 and the resistance $R^2$ is connected to the buttons also in a similar manner to that shown in Fig. 1. With the arm 20 in the position illustrated, the armature circuit is opened. The shunt field winding is permanently connected across the supply lines 22 and 23. To start the motor the arm 20 should be moved in a clockwise direction thereby closing the armature circuit and thereafter removing the resistance $R^2$ in steps, the first step being removed upon approximately one-half of the movement of the arm 20, the second step upon approximately three quarters of the movement of said arm and the third step upon full movement of the arm. This results as in the previous device in maintaining the same voltage conditions until the motor attains approximately one-half of its full speed. The voltage is then increased but is not further altered until the motor attains approximately three quarters of the full speed and then after a predetermined movement of the arm, full voltage is supplied.

What I claim as new and desire to secure by Letters Patent is as follows:—

1. A motor starting device provided with an element movable at a uniform rate of speed to increase the power supplied to the motor at intervals gradually diminishing in duration.

2. In a motor starter, in combination, voltage reducing means and controlling means therefor including an element movable at a uniform rate of speed to maintain all of said voltage reducing means in circuit until the motor has reached approximately one-half of its normal speed and thereafter vary said voltage reducing means at intervals gradually diminishing in duration.

3. In a device for starting electric motors in combination, voltage reducing means and a controlling element therefor, movable in steps of varying lengths to remove said voltage reducing means in a corresponding number of sections.

4. In a controller for starting electric motors, in combination, voltage reducing means and a controlling element movable in steps successively decreasing in length to remove said voltage reducing means in a corresponding number of sections.

5. In a controller for starting electric motors, in combination, voltage reducing means, a movable controlling element and a series of coöperating contacts therefor, controlling said voltage reducing means and connections between said voltage reducing means and said contacts necessitating varying degrees of movement of said controlling element to remove successive sections of said voltage reducing means.

6. In a controller for starting electric motors, in combination, voltage reducing means, a series of contacts connected to said voltage reducing means to divide the same into a plurality of steps and a controlling member movable over said contacts to remove said voltage reducing means from circuit, the removal of said voltage reducing means necessitating movement of said controlling member varying and gradually decreasing distances between successive steps.

In witness whereof, I have hereunto subscribed my name in the presence of two witnesses.

THOMAS E. BARNUM.

Witnesses:
E. H. ROCKWELL,
FRANK H. HUBBARD.

---

Copies of this patent may be obtained for five cents each, by addressing the "Commissioner of Patents, Washington, D. C."